United States Patent
Wang et al.

(10) Patent No.: US 11,573,836 B2
(45) Date of Patent: Feb. 7, 2023

(54) RESOURCE SCHEDULING METHOD AND APPARATUS, AND STORAGE MEDIUM

(71) Applicant: Beijing Baidu Netcom Science and Technology Co., Ltd., Beijing (CN)

(72) Inventors: Zexiang Wang, Beijing (CN); Ziang Jia, Beijing (CN)

(73) Assignee: Apollo Intelligent Connectivity (Beijing) Technology Co., Ltd., Beijing (CN)

( * ) Notice: Subject to any disclaimer, the term of this patent is extended or adjusted under 35 U.S.C. 154(b) by 148 days.

(21) Appl. No.: 17/142,770

(22) Filed: Jan. 6, 2021

(65) Prior Publication Data

US 2021/0373952 A1  Dec. 2, 2021

(30) Foreign Application Priority Data

May 28, 2020 (CN) .......................... 202010470780.1

(51) Int. Cl.
*G06F 9/46* (2006.01)
*G06F 9/50* (2006.01)
*G06F 1/3206* (2019.01)

(52) U.S. Cl.
CPC ............ *G06F 9/505* (2013.01); *G06F 1/3206* (2013.01); *G06F 9/5011* (2013.01); *G06F 9/5044* (2013.01); *G06F 9/5061* (2013.01)

(58) Field of Classification Search
CPC ...... G06F 9/505; G06F 9/5011; G06F 9/5044; G06F 9/5061
See application file for complete search history.

(56) References Cited

U.S. PATENT DOCUMENTS

| | | | |
|---|---|---|---|
| 2009/0265707 A1 | 10/2009 | Goodman et al. | |
| 2014/0108838 A1* | 4/2014 | Wei | G06F 9/505 713/322 |
| 2021/0144517 A1* | 5/2021 | Guim Bernat | G06F 9/542 |

FOREIGN PATENT DOCUMENTS

| | | |
|---|---|---|
| CN | 102929383 | 2/2013 |
| CN | 104331328 | 2/2015 |
| CN | 105260235 | 1/2016 |
| CN | 109960584 | 7/2019 |
| CN | 110597639 | 12/2019 |

(Continued)

OTHER PUBLICATIONS

Bey, K.B., et al. (2009) "CPU Load Prediction Model for Distributed Computing," Eighth Int'l Symposium on Parallel and Distributed Computing, pp. 39-45.

(Continued)

*Primary Examiner* — Gregory A Kessler
(74) *Attorney, Agent, or Firm* — Banner & Witcoff, Ltd.

(57) ABSTRACT

A resource scheduling method and apparatus, an electronic device, and a storage medium are provided, which are related to the technical field of system resource scheduling. The resource scheduling method comprises: monitoring whether a current system can bear a load of a target application which has triggered and entered a high-computational-power scenario, subjecting the system to resource scheduling if the system is monitored to be unable to bear the load of the target application, and running the target application in the high-computational-power scenario based on scheduled system resources.

18 Claims, 6 Drawing Sheets

(56) References Cited

FOREIGN PATENT DOCUMENTS

| | | |
|---|---|---|
| JP | 2011-100338 | 5/2011 |
| JP | 2012-058907 | 3/2012 |

OTHER PUBLICATIONS

Extended European Search Report EP 21150301.6 (2021) (9 pages).
Notice of Reasons for Refusal JP 2020-201112 (dated Sep. 20, 2022) (8 pages).

* cited by examiner

RESOURCE SCHEDULING METHOD AND APPARATUS, AND STORAGE MEDIUM

CROSS-REFERENCE TO RELATED APPLICATION

This application claims priority to Chinese Patent Application No. 202010470780.1, filed on May 28, 2020, which is hereby incorporated by reference in its entirety.

TECHNICAL FIELD

The embodiment of the present application relates to a technical field of computers, in particular to a technical field of system resource scheduling, and more particularly, to a resource scheduling method and apparatus, an electronic device, and a storage medium.

BACKGROUND

In an intelligent device such as an intelligent vehicle-mounted system, when many applications are loaded and running, or many functions are performed by an application, the CPU occupancy rate of the system is high.

SUMMARY

A resource scheduling method and apparatus, an electronic device, and a storage medium are provided according to embodiments of the application, which can ensure the smooth running of an application which has entered a high-computational-power scenario.

In a first aspect, a resource scheduling method is provided according to an embodiment of the application, including:

monitoring whether a current system is able to bear a load of a target application which has triggered and entered a high-computational-power scenario;

subjecting the system to resource scheduling in a case that the system is monitored to be unable to bear the load of the target application, and running the target application in the high-computational-power scenario based on scheduled system resources.

In a second aspect, a resource scheduling apparatus is provided according to an embodiment of the application, including:

a system monitoring module configured for monitoring whether a current system is able to bear a load of a target application which has triggered and entered a high-computational-power scenario;

a resource scheduling module configured for subjecting the system to resource scheduling in a case that the system is monitored to be unable to bear the load of the target application; and an application running module configured for running the target application in the high-computational-power scenario based on scheduled system resources.

In a third aspect, an electronic device is provided according to an embodiment of the application, including:

at least one processor; and
a memory communicatively connected with the at least one processor; wherein the memory stores instructions executable by the at least one processor, and the instruction, when executed by the at least one processor, enable the at least one processor to perform the resource scheduling method according to any one of the embodiments of the present application.

In a fourth aspect, a non-transitory computer-readable storage medium storing computer instructions is provided according to an embodiment of the application, the computer instructions cause a computer to perform the resource scheduling method of any one of the embodiments of the present application.

It should be understood that the description in this section is not intended to identify key or critical features of the embodiments of the application, nor is it intended to limit the scope of the application. Other features of the present application will become readily apparent from the following description.

BRIEF DESCRIPTION OF THE DRAWINGS

The drawings are provided to facilitate understanding of the present application rather than to be construed as limiting the present application, wherein.

DETAILED DESCRIPTION

Reference will now be made in detail to the exemplary embodiments of the present application in conjunction with the accompanying drawings, wherein the various details of the embodiments of the present application are included to facilitate understanding and are to be considered as exemplary only. Accordingly, one of ordinary skill in the art appreciates that various changes and modifications can be made to the embodiments described herein without departing from the scope and spirit of the present application. Also, descriptions of well-known functions and structures are omitted from the following description for clarity and conciseness.

Figure 1:
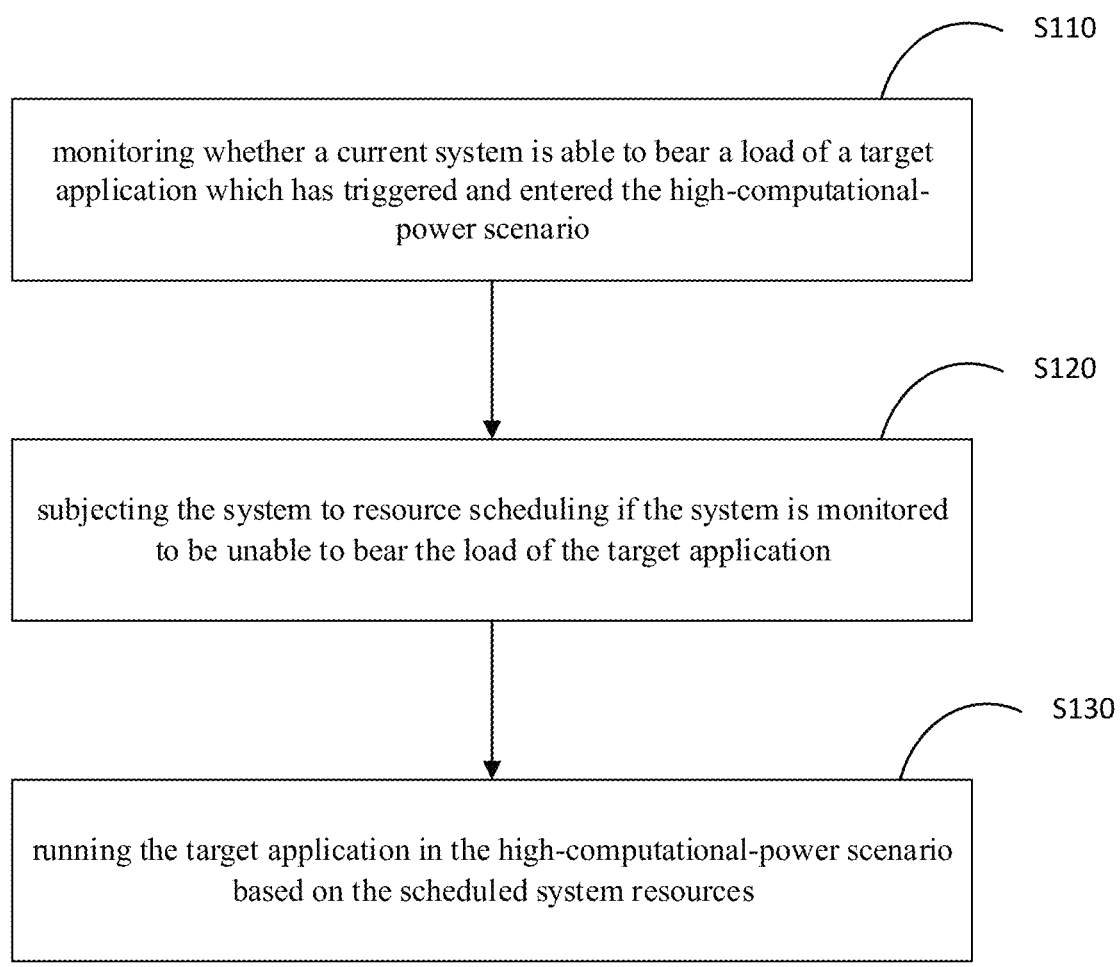
FIG. 1 is a flowchart of a resource scheduling method according to an embodiment of the present application.

FIG. 1 is a flowchart of a resource scheduling method according to an embodiment of the present application, the embodiment is suitable for a situation where a system is subjected to resource scheduling when a target application about to enter a high-computational-power scenario is monitored to exist in the current system so that the target application can run smoothly after entering the high-computational-power scenario, and the method can be performed by a resource scheduling apparatus, which is implemented in software and/or hardware and preferably provided in an electronic device, such as an intelligent device integrated with an intelligent vehicle-mounted system. As shown in FIG. 1, the method specifically includes S110-S130.

At S110, whether a current system is able to bear a load of a target application which has triggered and entered the high-computational-power scenario is monitored.

In a specific embodiment of the present application, the system refers to a computer program that manages the hardware and software resources of a device. Various applications (App) can be installed in the system and a running environment for the applications is provided by the system. In the meantime, one or more running applications can exist in the system, and accordingly, the running applications occupy some system resources.

In this embodiment, the computational power refers to the number of executions per second by a central processing unit (CPU), such as 14 thousand executions per second by the CPU. The high-computational-power scenario of the application refers to a running scenario requiring a high CPU computational power, for example, long-range navigation scenarios for map navigation applications, and voice recognition and parsing scenarios for intelligent voice applications, etc. When many applications are running in the system, or an application is performing too many functions, the CPU occupancy rate of the system is high, which means a great deal of CPU resources are occupied, thus the system is prone to lag and other undesirable phenomena.

Accordingly, a running application which has triggered but not yet entered the high-computational-power scenario can be determined as the target application by monitoring each running application in the system. Herein, whether the high-computational-power scenario of the application is triggered can be determined according to running state data of each running application on the basis of a preset condition to trigger the high-computational-power scenario. In the overall system, the high-computational-power scenario of the target application inevitably leads to the high-computational-power scenario of the system, for example, the CPU occupancy rate exceeds 92%. But this may not work the other way around, when the CPU occupancy rate is high, it is not certain that an application enters a high-computational-power scenario.

For exemplary purposes, a map application responds to a navigation request from a user and acquires information about a starting point and a destination input by the user. Before the map application starts navigation and route planning according to running state data such as the starting point and the destination, the system or a monitoring module special for system monitoring in the system can determine that the map application is the target application which has triggered the high-computational-power scenario if the current navigation is found to be long-range navigation according to the starting point and the destination. However, before system load pressure detection and system resource scheduling, the map application has not operated for navigation route planning.

In the embodiment, the load on the system for the target application means that the system can bear the load to run the target application, that is, the system can provide sufficient system resources for the target application to run smoothly, without any undesirable phenomenon such as lag which leads to poor user experience. It is appreciated that even if the high-computational-power scenario of the target application is triggered, system resource scheduling can be unnecessary if the system is monitored to be able to bear the load of the target application, which indicates that the target application can run smoothly thereafter. And if the system is monitored to be unable to bear the load of the target application, the subsequent target application will inevitably appears the phenomenon such as lag, and accordingly, system resource scheduling is necessary before the target application enters the high-computational-power scenario.

Specifically, an independent system monitoring module can be integrated in the system and used for monitoring the high-computational-power scenarios of the application and the system. For each application, a condition to trigger the high-computational-power scenario corresponding to each application can be preset. The system monitoring module determines the target application by synchronizing the running state data of the running applications in the system and finding whether the running state data of a running application meets the corresponding condition to trigger the high-computational-power scenario. Moreover, on the basis of the occupancy rate or an idle rate of the CPU of the system, a load pressure score of the system is calculated according to the running state data of all the running applications in the system. If the system load pressure score is greater than a load pressure threshold value, the system is determined to be unable to bear the load of the target application; otherwise, the system can bear the load of the target application.

With the development of vehicle intelligence, the intelligent vehicle-mounted system carries more intelligent devices, such as intelligent speakers, intelligent rearview mirrors, intelligent mobile phones, intelligent vehicle-mounted boxes, and more functions are embodied in these intelligent devices, including music, videos, maps, desktop launchers and the like. Due to the generally low configuration of the chip integrated in the intelligent vehicle-mounted system, improvement to hardware configurations of the system may correspondingly increase the product costs and reduce the sales. Thus, optionally, the system in the embodiment may be an intelligent vehicle-mounted system, and accordingly, the target applications include but are not limited to, map navigation applications, intelligent voice applications, and the like.

At S120, the system is subjected to resource scheduling if the system is monitored to be unable to bear the load of the target application.

In the specific embodiment of the application, when the system cannot bear the load of the target application, the target application itself needs more system resources to ensure smooth running. Accordingly, system resource scheduling in this embodiment refers to allocating more system resources to the target application for running.

For exemplary purposes, in an aspect of the system, the CPU frequency in the system can be regulated higher or even to the maximum frequency, so that the running speed of the CPU is improved, and the computing power of the system is enhanced. In an aspect of the system, the process handling time of the target application in the system can be prolonged on the basis of the time-sharing processing mechanism of the CPU, and the process handling time of the other running applications is shortened, namely, the target application is preferentially handled. In an aspect of the application, silence processes of the other running applications in the system can be suspended, namely, the function processes of the other running applications which are not perceived or are perceived little by users are suspended, and resources are appropriated to the target application for use as much as possible.

At S130, the target application is run in the high-computational-power scenario based on the scheduled system resources.

In a specific embodiment of the application, after the system resources are scheduled, the target application can enter the high-computational-power scenario, and the function corresponding to the high-computational-power scenario of the target application is realized. For example, the map navigation application may enter the long-range navigation scenario described above, plan a long-range navigated route, and provide navigation services to the user. In addition, system resources may be recovered when the high-computational-power scenario of the target application is monitored to have ended. For example, the CPU frequency recovers, the processes under the CPU time-sharing processing mechanism recover, the suspended function processes of the other running applications recover, and so on.

According to the technical solution of the embodiment, whether the current system can bear the load of the target application which has triggered and entered the high-computational-power scenario is monitored, and the system is subjected to resource scheduling if the system is monitored to be unable to bear the load of the target application, so that the target application is run in the high-computational-power scenario on the basis of the scheduled system resources. According to the embodiment of the present application, the applications and the system are monitored for the high-computational-power scenario, so that the system resources are scheduled when the system is monitored to be unable to bear the load, thereby providing sufficient system resources for the application which has entered the high-computational-power scenario, as such, not only the smooth running without any undesirable phenomenon such as lag which has entered the high-computational-power scenario is ensured, but also the need of upgrading hardware configurations of the system are dispensed with, and the hardware costs of the system are reduced.

Figure 2:
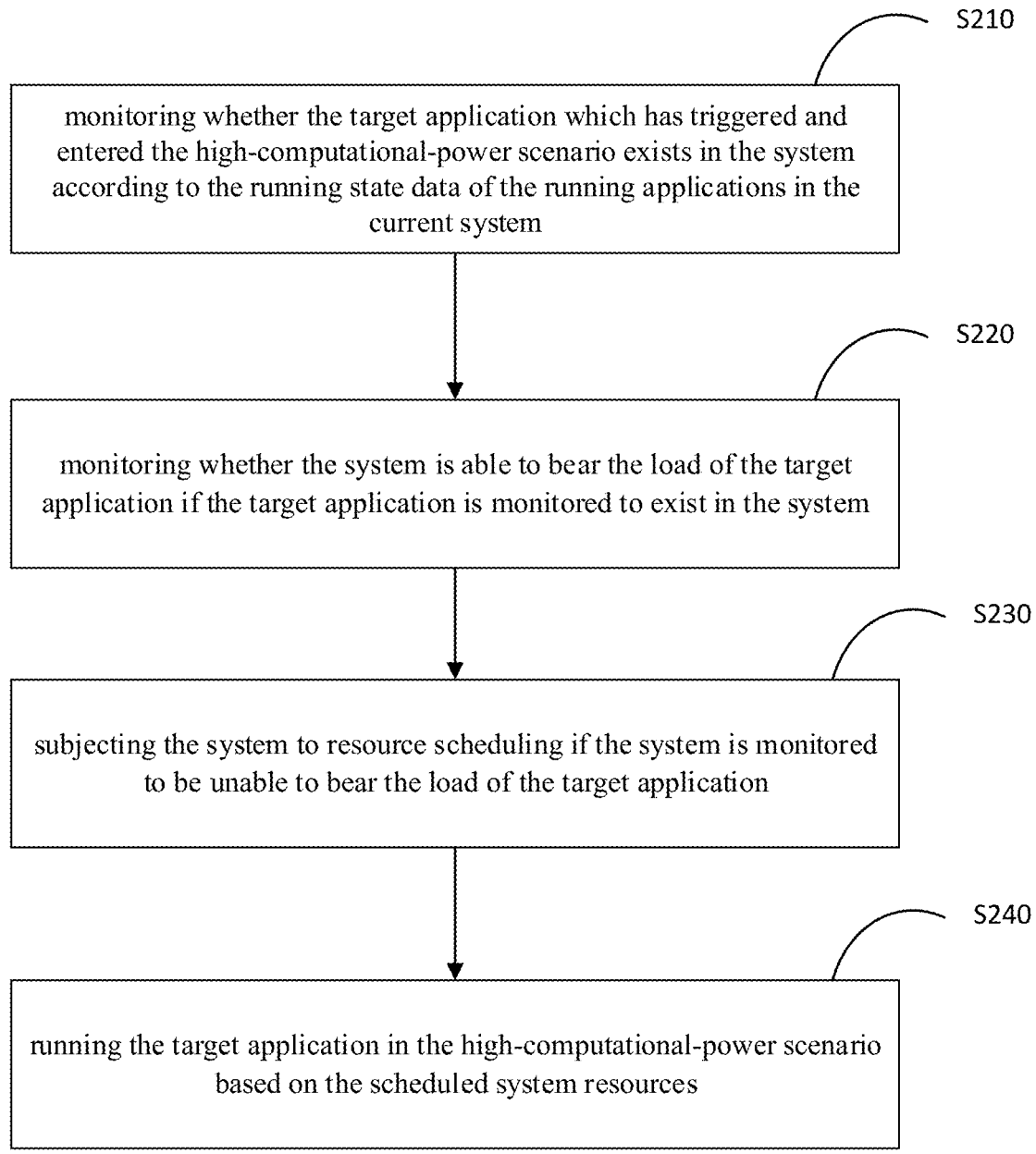
FIG. 2 is a flowchart of another resource scheduling method according to an embodiment of the present application.

FIG. 2 is a flow chart of another resource scheduling method according to an embodiment of the present application, further explaining S110 where whether the current system can bear the load of the target application which has triggered and entered the high-computational-power scenario is monitored, on the basis of the above embodiment. Whether the target application which has triggered and entered the high-computational-power scenario exists in the system is monitored according to the running state data of the running applications in the current system; and if the target application exists in the system, whether the system can bear the load of the target application is monitored. As shown in FIG. 2, the method specifically includes S210-S240.

At S210, whether the target application which has triggered and entered the high-computational-power scenario exists in the system is monitored according to the running state data of the running applications in the current system.

In a specific embodiment of the present application, the running application refers to an application running in the system, such as a map navigation application that is navigating, an intelligent voice application that is interacting through voice with a user, and a music application that is playing music.

In this embodiment, the running state data may include data received or generated during all current operations of the running application, including, but not limited to, application basic parameters, parameters identifying the application state, user input data, attribute parameters of the user input data, etc. For example, the running state data of the map navigation application may include at least current location coordinates of a vehicle, position coordinates of the navigated destination, speed of the vehicle, traffic conditions, and the like; the running state data of the intelligent voice application can at least include whether the intelligent voice application is recording, whether the intelligent voice application is parsing, a length of recorded audio, a recording duration and the like; the running state data of the music application may at least include whether the music application is playing, buffering or parsing, a length of the buffered or parsed audio, a volume of the buffered or parsed audio file, and the like.

Specifically, an independent system monitoring module can be integrated in the system for synchronizing the running state data of each running application in the system in real time and predicting if there is a target application which is about to enter the high-computational-power scenario according to the running state data of each running application.

Optionally, a running application is determined as the target application if the running state data of the running application is detected to meet the condition to trigger the high-computational-power scenario.

In the embodiment, the condition to trigger the high-computational-power scenario is used for finding whether the application is about to enter the high-computational-power scenario. Each application in the system has one or more high-computational-power scenarios, and each high-computational-power scenario has a corresponding condition to trigger the high-computational-power scenario. For example, the high-computational-power scenario for a map navigation application may include a long-range navigation scenario, etc.; the high-computational-power scenario for the intelligent voice application may include a long-time recording scenario, a large-volume audio file semantic parsing scenario, etc.; the high-computational-power scenario for the music application may include a large-volume audio file buffering and decoding scenario, etc.

Specifically, according to a condition of system resources occupied by each application when entering the high-computational-power scenario, the high-computational-power scenario of each application can be defined in advance, and the condition to trigger the high-computational-power scenario is set for each high-computational-power scenario. Therefore, after the system monitoring module synchronously acquires the running state data of each running application, the running state data is subjected to computing, or the running state data is directly compared with the corresponding condition to trigger the high-computational-power scenario, and the running application meeting the condition to trigger the high-computational-power scenario is determined as the target application.

For exemplary purposes, during the navigation of the map navigation application, if an estimated route from the starting point to the destination is determined to be greater than a high-computational-power scenario threshold value, and/or the number of crossroads along the estimated route is greater than a high-computational-power scenario threshold value, then the high-computational-power scenario of the map navigation application is determined to be triggered; when the intelligent voice application is recording or parsing, if the length of the voice is greater than a high-computational-power scenario threshold value, then the high-computational-power scenario of the intelligent voice application is determined to be triggered; when the music application buffers or decodes an audio file, if the audio duration or the file volume is greater than a high-computational-power scenario threshold value, the high-computational-power scenario of the music application is determined to be triggered.

Herein, a basis is provided for predicting the high-computational-power scenario through the preset condition to trigger the high-computational-power scenario, the accuracy of the prediction is improved to determine the current running priorities of running applications in the system, and then the target application about to enter the high-computational-power scenario and in need of ensured smooth running is identified accurately.

At S220, whether the system is able to bear the load of the target application is monitored if the target application is monitored to exist in the system.

In the specific embodiment of the application, the high-computational-power scenario of the target application inevitably leads to the high-computational-power scenario of the system, for example, the CPU occupancy rate exceeds 92%; however, the other way around, when the high CPU occupancy rate is high, it is not certain that an application enters a high-computational-power scenario, for example, the system can still bear a load of short-range navigation of the map navigation application when the CPU occupancy rate exceeds 92%. Therefore, the embodiment will monitor whether the system can bear the load of the target application only if the target application which has triggered and entered the high-computational-power scenario is monitored to exist in the system, namely, that is, the target application in need of ensured smooth running currently is identified accurately in the system.

Specifically, the embodiment can comprehensively determine whether the system can bear the load of the target application in the high-computational-power scenario on the basis of the CPU occupancy rate and the specific running conditions of all the running applications in the system. If the system is determined to be able to bear the load, each application in the system runs normally; if the system is determined to be unable to bear the load, the system monitoring module can broadcast to the other running applications except the target application to inform the other running applications of the existence of the target application and that the system is about to enter the high-computational-power scenario, thereby facilitating subsequent system resource scheduling.

Optionally, calculating the system load pressure score according to the current running state data of each running application in the system and the current CPU idle rate; and if the load pressure score of the system is detected to be greater than the load pressure threshold value, then the system is determined to be unable to bear the load of the target application.

In the embodiment, the CPU idle rate refers to the proportion of unused system resources in the system to the total resources, and the CPU idle rate is equal to 1 minus the CPU occupancy rate. The system load pressure score measures the current load pressure of the system. A higher system load pressure score indicates a higher pressure of the system currently and a greater possibility of appearing the phenomenon such as lag of the application running in the current system environment. Herein, the load pressure threshold value is preset, and when the load pressure score is detected to be greater than the load pressure threshold value, the system is determined unable to bear the load of the target application.

Specifically, the system load pressure score may be calculated according to the following formula: System Load Pressure Score=(CPU Idle Rate×Weight 0+Running State Data of Application 1×Weight 1+Running State Data of Application 2×Weight 2+ . . . +Running State Data of Application N×Weight N)×100.

Applications 1 through N are all the applications installed in the system. The running state data in the form of numerical values can be directly substituted into the formula, while for the running state data in the form of state indicators, corresponding representative scores can be set for the states indicated thereby in advance, for example, the state of not recording is represented as 0, and the state of recording is represented as 0.8, and then the representative scores of the states are substituted into the formula. When the application is not running, the corresponding running state data is 0. Because the applications differ in system resource occupancy, corresponding weights can also be set for the CPU idle rate and each application, and the sum of the weights 0 through N is 1. Assuming that the maximum value of the system load pressure score is 100 and the load pressure threshold value is 85, when the current system load pressure score is detected to exceed 85, the system is determined to be unable to bear the load of the target application.

Figure 3:
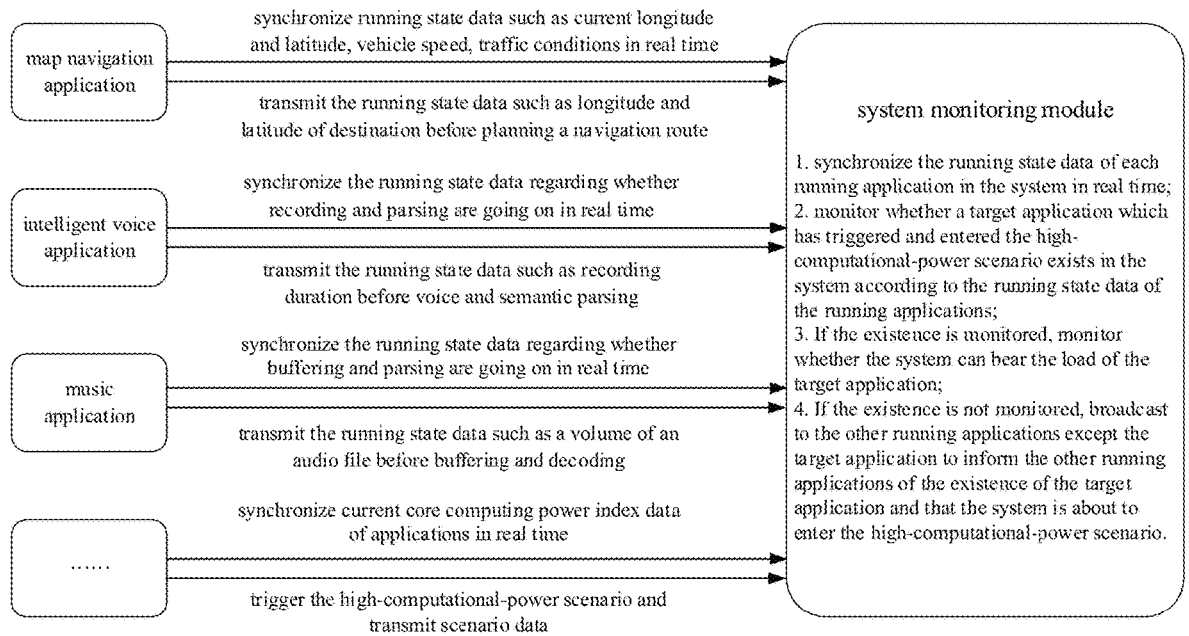
FIG. 3 is an exemplary diagram of system monitoring according to an embodiment of the present application.

For exemplary purposes, FIG. 3 is an exemplary diagram of system monitoring. As shown in FIG. 3, the running state data may be subdivided into core computational-power index data and scenario data to trigger the high-computational-power scenario. Each running application in the system can synchronize the core computational-power index data to the system monitoring module in real time, and transmit the scenario data that may trigger the high computing power scenario to the system monitoring module. As such, the system monitoring module monitors the application in real time and predicts whether the target application which has triggered the high-computational-power scenario exists, and whether the system can bear the load of the target application when the target application exists is predicted. And finally, when the system cannot bear the load of the target application, the system monitoring module broadcasts to the other running applications except the target application to inform the existence of the target application and that the system is about to enter the high-computational-power scenario. For example, the map navigation application synchronizes information such as the longitude and latitude, the vehicle speed and the traffic condition of the map navigation application to the system monitoring module in real time, and transmits the longitude and latitude of the destination to the system monitoring module upon receipt of a navigation request from a user for the system monitoring module to monitor in real time.

Herein, on the basis of the current running state data of each running application and the CPU idle rate in the system, the capacity of the system to bear the load of the target application in the high-computational-power scenario is measured by calculating the load pressure score of the system, avoiding ignorance of the target application truly in need of ensured smooth running when the load pressure of the system is evaluated solely according to system the index such as CPU occupancy rate, so that the accuracy of the load pressure measurement of the system is improved, the subsequent system resource scheduling is ensured to be performed when the pressure is high (i.e., when the target application may lag in running), preventing useless scheduling of the system resources.

According to the embodiment, at first, the high-computational-power scenario of the running application is monitored, and whether the system can bear the load of the target application in the high-computational-power scenario is not predicted until the target application which has triggered and entered the high-computational-power scenario is monitored to exist in the system, so that not only is the target application in need of ensured smooth running currently in the system is identified, but also a further basis is provided for the evaluation of the load pressure of the system. As such, the real capacity of the system to bear the load of the target application in the high-computational-power scenario is obtained, the subsequent system resource scheduling is ensured to be performed when the pressure is high (i.e., when the target application may lag in running), preventing useless scheduling of the system resources.

At S230, the system is subjected to resource scheduling if the system is monitored to be unable to bear the load of the target application.

At S240, the target application in the high-computational-power scenario is run based on the scheduled system resources.

According to the technical solution of the embodiment, whether the target application which has triggered and entered the high-computational-power scenario exists in the system is monitored on the basis of the running state data of each currently running application in the system, and the capacity of the system to bear the load of the target application in the high-computational-power scenario is monitored only when the existence of the target application is monitored, so that the system is subjected to resource scheduling when the system is monitored to be unable to bear the load of the high-computational-power of the application, to run the target application in the high-computational-power scenario on the basis of the scheduled system resources. According to the embodiment of the present application, the applications and the system are monitored for the high-computational-power scenario, so that the system resources are scheduled when the system is monitored to be unable to bear the load, thereby providing sufficient system resources for the application which has entered the high-computational-power scenario, as such, not only the smooth running without any undesirable phenomenon such as lag of the application which has entered the high-computational-power scenario is ensured, but also the need of upgrading hardware configurations of the system are dispensed with, and the hardware costs of the system are reduced.

Figure 4:
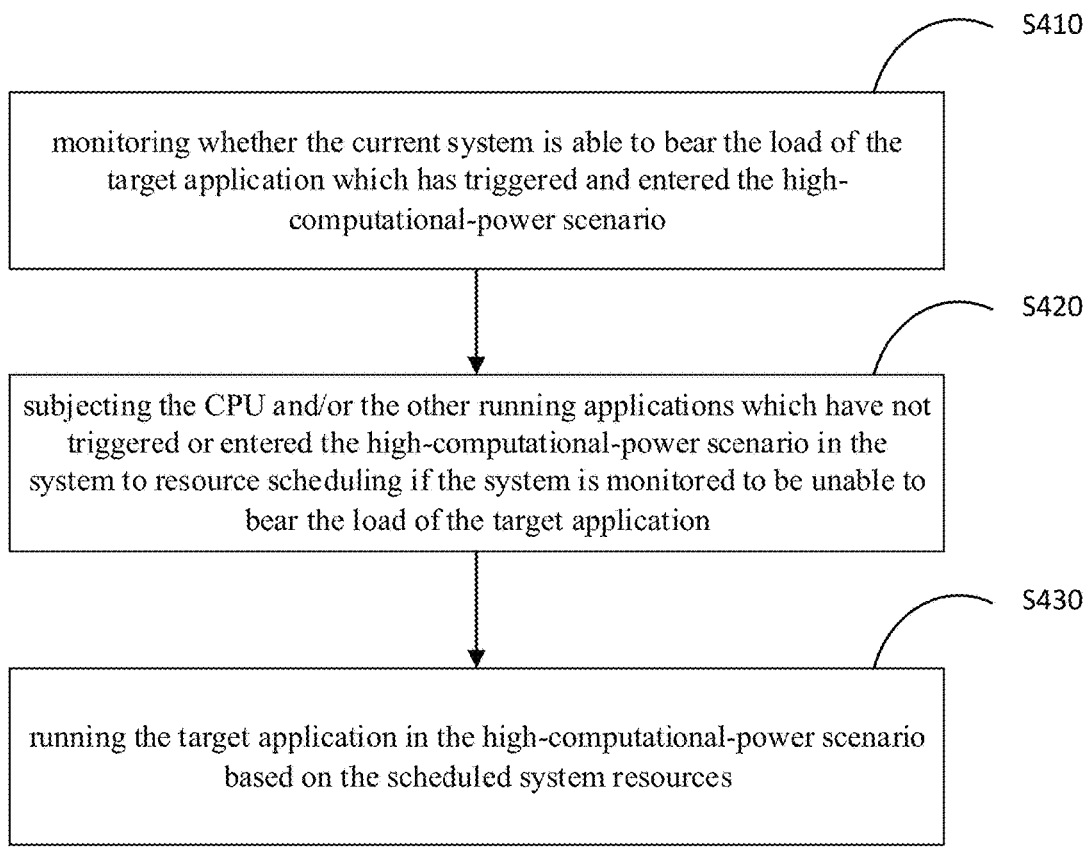
FIG. 4 is a flowchart of another resource scheduling method according to an embodiment of the present application.

FIG. 4 is a flowchart of another resource scheduling method according to an embodiment of the present application, the embodiment further explains the system resource scheduling in S120 on the basis of the above embodiment, and can subject the CPU and/or the other running applications which have not triggered or entered the high-computational-power scenario in the system to resource scheduling. As shown in FIG. 4, the method specifically includes S410-S430.

At S410, whether the current system is able to bear the load of the target application which has triggered and entered the high-computational-power scenario is monitored.

At S420, the CPU and/or the other running applications which have not triggered or entered the high-computational-power scenario in the system are subjected to resource scheduling if the system is monitored to be unable to bear the load of the target application.

In the specific embodiment of the application, the functions of the CPU mainly include processing instructions, executing operations, controlling time and processing data, and the CPU is a core hardware unit for controlling and allocating all hardware resources (such as a memory and an input/output unit) of a computer and executing general computing. By changing the CPU configuration, higher running speed and longer running time are possible for the target application.

In the present embodiment, the other running applications refer to applications other than the target application among the running applications, namely, the running applications which have not triggered or entered the high-computational-power scenario. Because the other running applications also occupy some system resources when running, the process handling state in the other running applications can be adjusted adaptively to provide more system resources for the target application.

Herein, scheduling any one of the CPU and the other running applications can provide more system resources for the target application so as to support the running in the high-computational-power scenario. Therefore, system resource scheduling on the basis of CPU and the other running applications can be used independently or in combination. It is appreciated that the more usages in combination, the more system resources provided for the target application, the smoother the target application runs.

According to the embodiment of the present application, hardware configurations of the system are not upgraded, instead, the system resource scheduling of the system is performed on the software level, hence the original costs of the hardware configuration of the system are kept, avoiding increased product costs and the influence on the sales caused by upgraded hardware configurations of the system. Besides, the limited resources in the system can be flexibly scheduled, fully exploiting the potentials to assist the target application in running in the high-computational-power scenario, and improving the utilization rate of the system resources.

Optionally, on the time-sharing processing mechanism of the CPU, the process handling time of the target application in the system is prolonged, and the process handling time of the other running applications is shortened.

In the embodiment, the time-sharing processing mechanism of the CPU means that the CPU is controlled by a clock to complete a part of each task within a certain time slice, save the result of intermediate processing, and then execute and save a part of the next task, and this cycle keeps going until all the tasks are completed. Herein, the handling time slice of each task is short, but the result of each task processing is not influenced because of the high computing speed of the CPU. For example, three processes A, B and C are run under the time-sharing mechanism, process B runs after process A has run for 1 s, process C runs after process B has run for 1 s, and process A runs after process C has run for 2 s, this cycle keeps going until these three processes are completed.

In the time-sharing processing mechanism of the CPU, in one processing cycle, the process handling time of the target application is prolonged, and the process handling time of the other running applications is shortened, so that a high-computational-power process is set to be an approximate real-time process. Herein, the manner of prolonging and shortening the process handling time is not limited in the embodiment. For example, in the above embodiment, assuming that process A is a high-computational-power process, modifications can be made such that process B runs after process A has run for 3 s, and process C runs after process B has run for 0.5 s, and the cycle keeps going.

Herein, by adjusting the handling time of each process under the CPU time-sharing processing mechanism, the priority of the process processing in each running application is properly adjusted to appropriate more CPU computing capacity to the target application from the other running applications, and prolong the handling time of the target application in one CPU processing cycle.

Optionally, the CPU frequency in the system is adjusted to the maximum frequency.

In the present embodiment, the CPU frequency refers to the clock frequency of the CPU, namely, the frequency at which the CPU operates (the number of synchronization pulses generated within 1 second), which determines the running speed of the computer. The maximum frequency refers to the maximum value of the CPU frequency. Accordingly, when the CPU reaches the maximum frequency, the computer reaches the highest running speed and the best data processing capacity.

In the embodiment, a CPU frequency regulation rule in the high-computational-power scenario can be added to the system in advance, and the CPU frequency is directly up-regulated to the maximum frequency when the system is monitored to be unable to bear the load of the target application which has triggered and entered the high-computational-power scenario. For example, the maximum frequency of the CPU is written into the system address sys/devices/system/cpu/cpu0/cpufreq/scaling_min_freq, so that the system directly regulates frequency on the basis of the written frequency.

Herein, in the conventional CPU frequency regulation, the CPU frequency is continuously changing, featuring an overall long duration of frequency regulation. However, the target application enters the high-computational-power scenario too instantly for the traditional CPU frequency regulation method to catch up with, that is, the CPU frequency is still in a slow regulation process at the moment the target application enters the high-computational-power scenario, and thus fails to support the target application in the high-computational-power scenario. Compared with the existing technology, the duration of frequency regulation of the CPU is greatly shortened in the embodiment to provide the target application with the highest running speed as soon as possible, thereby best ensuring the smooth running of the target application.

Optionally, the silence processes of the other running applications in the system are suspended.

In the present embodiment, the silence refers to a function having no prompt to or interaction with the user, i.e., a function not perceived or little perceived by the user with his/her eyes or ears. For example, functions such as buffering, parsing, downloading, or monitoring in the background of the system.

Specifically, the processes in the running applications can be identified to determine the silence processes in the running applications, and all the silence processes are suspended, that is, the processes not influencing the user experience are suspended, avoiding occupancy of system resources by the processes having no or little influence on the user experience, thereby appropriating more system resources to the target application without influencing the user experience.

For exemplary purposes, since the music playing function of the music application is fully perceived by the user, the process associated with the music playing function of the music application is preserved. The monitoring, downloading, and uploading functions in the background of the other running applications can be suspended.

Herein, the manner of identifying the silence function is not limited in the embodiment, and any manner where the silence function can be identified can be applied to the embodiment. For example, functions in various applications in the system may be pre-classified to pre-screen out silence functions, thereby comparing the function to be detected with the pre-set silence functions to identify silence functions.

At S430, the target application in the high-computational-power scenario is run based on the scheduled system resources.

In the specific embodiment of the application, after the system resources are scheduled, the target application can instantly enter the high-computational-power scenario to implement the function corresponding to the high-computational-power scenario of the target application. Herein, in the operation process of the target application, whether the target application ends the high-computational-power scenario can be monitored in real time on the basis of the monitoring mode for the application and the system in the embodiment, and whether the system ends the load of the high-computational-power scenario can be determined through the calculation of the system load pressure score. And the scheduled system resources are recovered when the end of the high-computational-power scenario of the target application and the system is monitored, that is, the CPU frequency recovers, processes of the CPU time-sharing processing recover and the function processes suspended of the other running applications recover.

Figure 5:
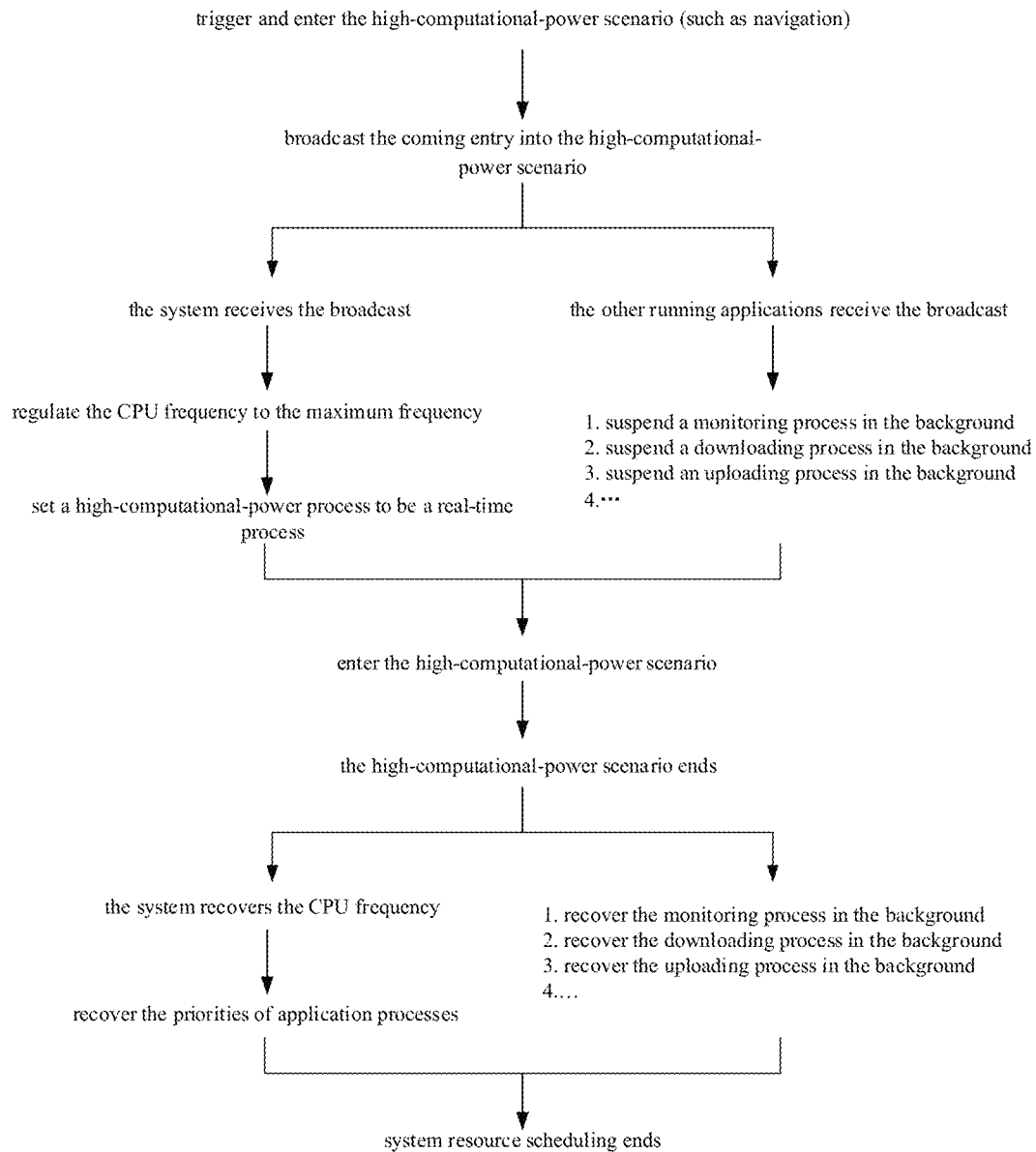
FIG. 5 is an exemplary diagram of system resource scheduling according to an embodiment of the present application.

For exemplary purposes, FIG. 5 is an exemplary diagram of system resource scheduling. As shown in FIG. 5, when the target application and the system are determined to be about to enter the high-computational-power scenario, such as long-range navigation, the system monitoring module broadcasts the coming entry into the high-computational-power scenario. Correspondingly, after the system receives the broadcast, the CPU frequency is regulated to the maximum frequency, and the high-computational-power process in the target application is set to be a real-time process; the other running applications suspend a series of silence processes such as background monitoring, downloading, uploading after receiving the broadcast. As such, system resource scheduling is completed to enter the high-computational-power scenario. When the high-computation scenario ends, the CPU frequency and the application process priority in the system recover, and a series of silence processes such as background monitoring, downloading and uploading recover for the other running applications. Now the system resource scheduling in the high-computational-power scenario is completed.

According to the technical solution of the embodiment, whether the current system can bear the load of the target application which has triggered and entered the high-computational-power scenario is monitored, and when the system is monitored to be unable to bear the load of the target application, the CPU and/or the other running applications in the system are subjected to resource scheduling so as to run the target application in the high-computational-power scenario on the basis of the scheduled system resources. According to the embodiment of the present application, the applications and the system are monitored for the high-computational-power scenario, so that the system resources are scheduled when the system is monitored to be unable to bear the load, thereby providing sufficient system resources for the application which has entered the high-computational-power scenario, as such, not only the smooth running without any undesirable phenomenon such as lag of the application which has entered the high-computational-power scenario is ensured, but also the need of upgrading hardware configurations of the system are dispensed with, and the hardware costs of the system are reduced.

Figure 6:
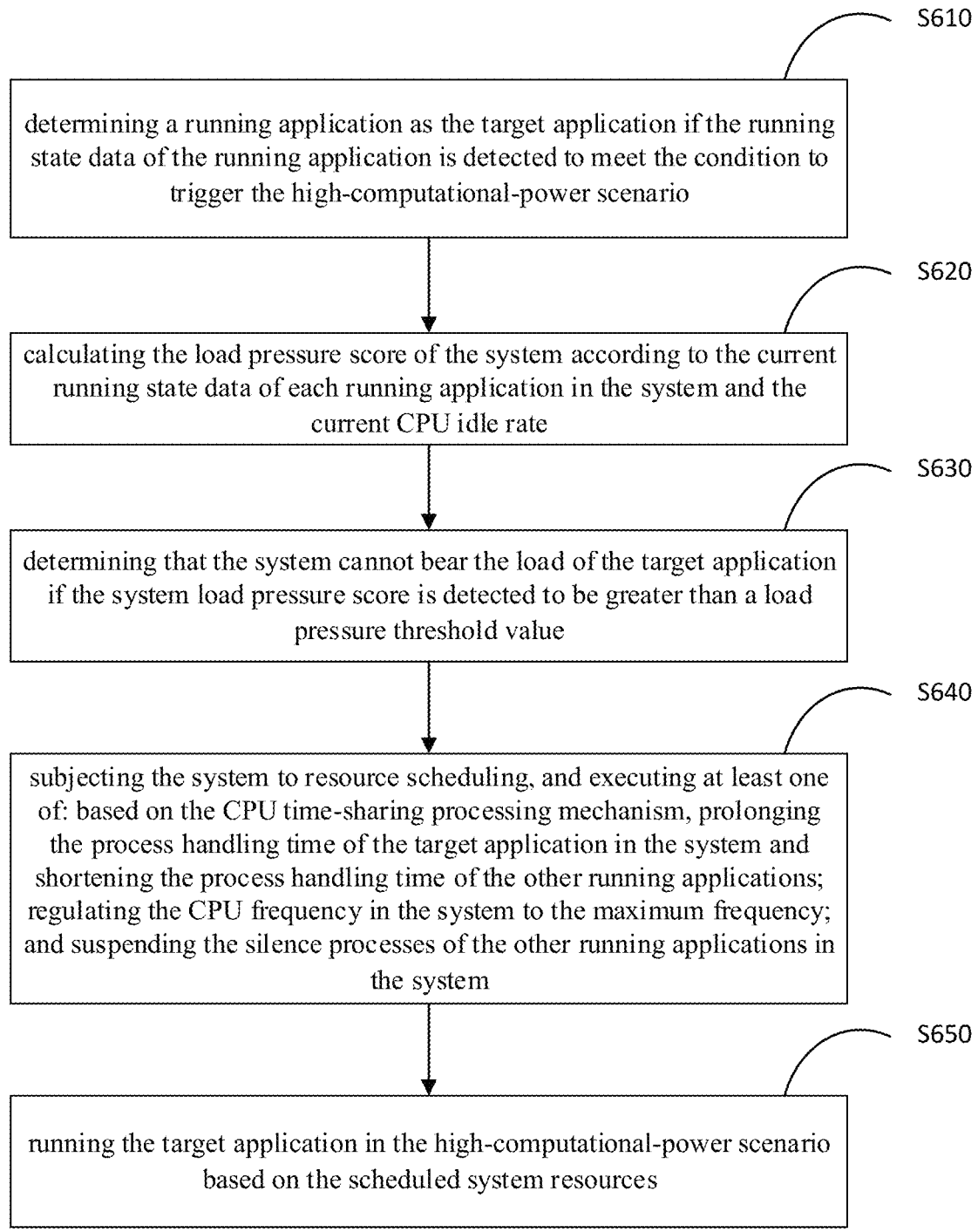
FIG. 6 is a flowchart of another resource scheduling method according to an embodiment of the present application.

FIG. 6 is a flowchart of another resource scheduling method according to an embodiment of the present application, and the embodiment further integrates the implementation of S110 and S120 on the basis of the above embodiments. As shown in FIG. 6, the method specifically includes:

S610, determining a running application as the target application if the running state data of the running application is detected to meet the condition to trigger the high-computational-power scenario;

S620, calculating the load pressure score of the system according to the current running state data of each running application in the system and the current CPU idle rate;

S630, determining that the system cannot bear the load of the target application if the system load pressure score is detected to be greater than a load pressure threshold value;

S640, subjecting the system to resource scheduling, and executing at least one of: based on the CPU time-sharing processing mechanism, prolonging the process handling time of the target application in the system and shortening the process handling time of the other running applications; regulating the CPU frequency in the system to the maximum frequency; and suspending the silence process of the other running applications in the system; and S650, running the target application in the high-computational-power scenario based on the scheduled system resources.

According to the technical solution of the embodiment, the applications and the system are monitored for the high-computational-power scenario, so that the system resources are scheduled when the system is monitored to be unable to bear the load, thereby providing sufficient system resources for the application which has entered the high-computational-power scenario, as such, not only the smooth running without any undesirable phenomenon such as lag of the application which has entered the high-computational-power scenario is ensured, but also the need of upgrading hardware configurations of the system are dispensed with, and the hardware costs of the system are reduced.

Figure 7:
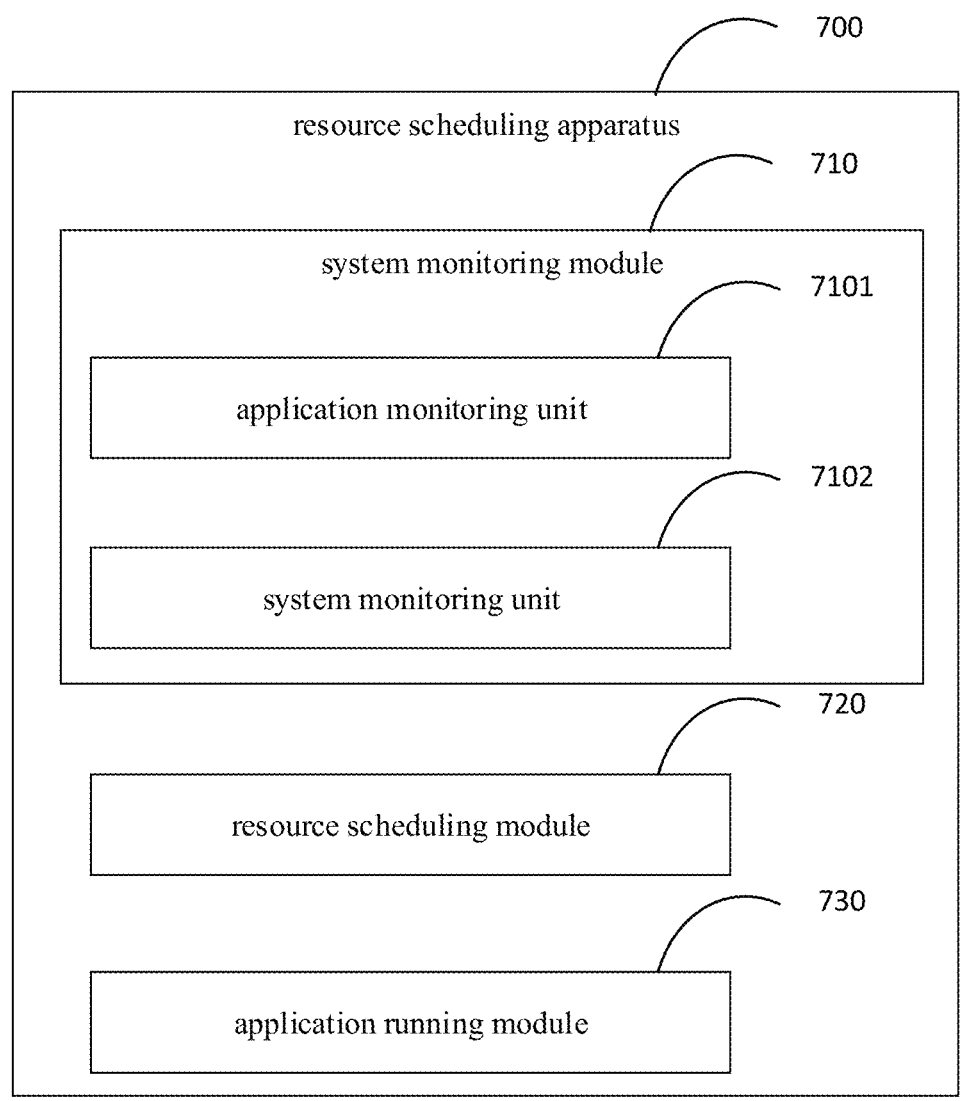
FIG. 7 is a structural schematic diagram of a resource scheduling apparatus according to an embodiment of the present application.

FIG. 7 is a structural schematic diagram of a resource scheduling apparatus according to an embodiment of the present application, the embodiment can be applied to a situation where the system is subjected to resource scheduling when a target application about to enter the high-computational-power scenario is monitored to exist in the current system so that the target application can run smoothly after entering the high-computational-power scenario, and the apparatus can realize the resource scheduling method according to any embodiment of the present application. The apparatus 700 specifically includes:

a system monitoring module 710 configured for monitoring whether a current system is able to bear a load of a target application which has triggered and entered a high-computational-power scenario;

a resource scheduling module 720 configured for subjecting the system to resource scheduling if the system is monitored to be unable to bear the load of the target application; and an application running module 730 configured for running the target application in the high-computational-power scenario based on the scheduled system resources.

Optionally, the system monitoring module 710 includes:

an application monitoring unit 7101 configured for monitoring whether a target application which has triggered and entered the high-computational-power scenario exists in the system according to the running state data of the running applications in the current system; and a system monitoring unit 7102 configured for monitoring whether the system can bear the load of the target application if the target application is monitored to exist in the system;

Optionally, the application monitoring unit 7101 is specifically configured for:

determining a running application as the target application if the running state data of the running application is detected to meet the condition to trigger the high-computational-power scenario.

Optionally, the system monitoring unit 7102 is specifically configured for:

calculating a system load pressure score according to the current running state data of each running application in the system and a current idle rate of the CPU; and determining that the system cannot bear the load of the target application if the system load pressure score is detected to be greater than a load pressure threshold value.

Optionally, the resource scheduling module 720 is specifically configured for:

subjecting the CPU and/or the other running applications which have not triggered or entered the high-computational-power scenario in the system to resource scheduling.

Optionally, the resource scheduling module 720 is specifically configured for:

based on a time-sharing processing mechanism of the CPU, prolonging a process handling time of the target application in the system, and shortening the process handling time of the other running applications.

Optionally, the resource scheduling module 720 is specifically configured for:

regulating the CPU frequency in the system to the maximum frequency.

Optionally, the resource scheduling module 720 is specifically configured for:

suspending the silence processes of the other running applications in the system.

Optionally, the system is an intelligent vehicle-mounted system and the target application at least includes a map navigation application and an intelligent voice application.

According to the technical solution of the embodiment, the functions, such as synchronization of the running state data of applications, monitoring of the high-computational-power scenario of the target application, monitoring of system load pressure, regulation of the CPU frequency, appropriation of the CPU time-sharing processing mechanism, suspension of silence processes of the other running applications, entry into the high-computational-power scenario, end of the high-computational-power scenario, and recovery of the system, are realized through the collaboration of the functional modules. According to the embodiment of the present application, the applications and the system are monitored for the high-computational-power scenario, so that the system resources are scheduled when the system is monitored to be unable to bear the load, thereby providing sufficient system resources for the application which has entered the high-computational-power scenario, as such, not only the smooth running without any undesirable phenomenon such as lag of the application which has entered the high-computational-power scenario is ensured, but also the need of upgrading hardware configurations of the system are dispensed with, and the hardware costs of the system are reduced.

An electronic device and a readable storage medium are provided according to embodiments of the present application.

Figure 8:
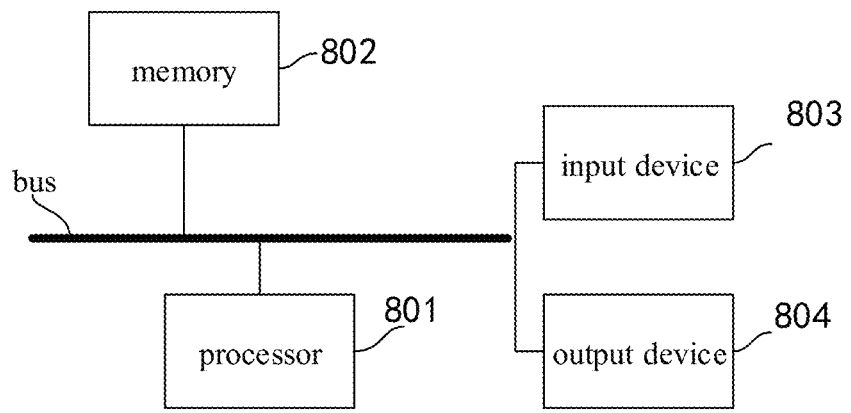
FIG. 8 is a block diagram of an electronic device used to implement a resource scheduling method according to an embodiment of the present application.

FIG. 8 is a block diagram of an electronic device used to implement the resource scheduling method according to an embodiment of the present application. The electronic device is intended to represent various forms of digital computers, such as laptop computers, desktop computers, workstations, personal digital assistants, servers, blade servers, mainframe computers, and other suitable computers. The electronic device may also represent various forms of mobile devices, such as personal digital processors, cellular telephones, smartphones, wearable devices, and other similar computing devices. The components shown herein, their connections and relationships, and their functions are by way of example only and are not intended to limit the implementations of the application described and/or claimed herein.

As shown in FIG. 8, the electronic device includes one or more processors 801, a memory 802, and interfaces for connecting components, including high-speed interfaces and low-speed interfaces. The components are interconnected using different buses and may be mounted on a common mainboard or otherwise as desired. The processor may process instructions for execution within the electronic device, including instructions stored in the memory or on the memory to display graphical information of a graphical user interface (GUI) on an external input/output device (e.g., a display device coupled to the interface). In other embodiments, multiple processors and/or multiple buses may be used with multiple memories, if desired. Also, connections may be made among multiple electronic devices, each providing some of the necessary operations (e.g., as an array of servers, a set of blade servers, or a multiprocessor system). An example of one processor 801 is shown in FIG. 8.

The memory 802 is the non-transitory computer-readable storage medium provided by the present application. Herein, the memory stores instructions executable by at least one processor to cause the at least one processor to perform the resource scheduling method provided herein. The non-transitory computer-readable storage medium of the present application stores computer instructions for causing a computer to perform the resource scheduling method provided herein.

The memory 802, as a non-transitory computer-readable storage medium, may be used to store non-transitory software programs, non-transitory computer-executable programs, and modules, such as program instructions/modules corresponding to the resource scheduling method in the embodiments of the present application (e.g., xx module x01, xx module x02, and xx module x03 shown in FIG. X). The processor 801 executes various functional applications and data processing of the server, namely, to implement the resource scheduling method in the above method embodiment, by running non-transient software programs, instructions, and modules stored in the memory 802.

The memory 802 may include a storage program area and a storage data area, wherein the storage program area may store an operating system, an application program required for at least one function; the storage data area may store data and the like created according to use of the electronic device to implement the resource scheduling method. In addition, the memory 802 may include a high-speed random access memory, and may also include a non-transitory memory, such as at least one disk storage device, flash memory device, or other non-transitory solid-state storage devices. In some embodiments, the memory 802 optionally includes memories remotely located with respect to processor 801, which may be connected to the electronic device to implement the resource scheduling method via a network. Examples of such networks include, but are not limited to, the Internet, intranets, local area networks, mobile communication networks, and combinations thereof.

The electronic device to implement the resource scheduling method may further include an input device 803 and an output device 804. The processor 801, the memory 802, the input device 803, and the output device 804 may be connected via a bus or other means, exemplified by a bus connection in FIG. 8.

The input device 803 may receive input numeric or character information and generate key signal inputs related to user settings and functional controls of the electronic device to implement the resource scheduling method, and examples of the input device 803 include touch screens, keypads, mice, track pads, touch pads, pointing sticks, one or more mouse buttons, track balls, joysticks, etc. The output device 804 may include display devices, auxiliary lighting apparatus (e.g., a Light Emitting Diode (LED)), a tactile feedback apparatus (e.g., a vibrating motor), etc. The display device may include but is not limited to, a liquid crystal display (LCD), an LED display, and a plasma display. In some embodiments, the display device may be a touch screen.

Various embodiments of the system and technique described herein may be implemented in a digital electronic circuit system, an integrated circuit system, an Application Specific Integrated Circuit (ASIC), computer hardware, firmware, software, and/or combinations thereof. These various embodiments may be embodied in one or more computer programs, which can be executed and/or interpreted on a programmable system including at least one programmable processor which can be a dedicated or general-purpose programmable processor, and can receive data and instructions from, and transmit data and instructions to, a memory system, at least one input device, and at least one output device.

These computing programs (also referred to as programs, software, software applications, or code) include machine instructions of a programmable processor, and may be implemented using advanced procedure-oriented and/or object-oriented programming languages, and/or assembly/ machine languages. As used herein, the terms "machine-readable medium" and "computer-readable medium" refer to any computer program product, device, and/or apparatus (e.g., magnetic disk, optical disk, memory, programmable logic device (PLD)) for providing machine instructions and/or data to a programmable processor, including a machine-readable medium that receives machine instructions as machine-readable signals. The term "machine-readable signal" refers to any signal used to provide machine instructions and/or data to a programmable processor.

To provide for interaction with a user, the system and technique described herein may be implemented on a computer having: a display device (for example, a cathode ray tube (CRT) or an LCD monitor) for displaying information to a user; and a keyboard and a pointer apparatus (e.g., a mouse or a trackball) through which the user can provide input to the computer. Other types of apparatuses may also be used to provide interaction with the user; for example, the feedback provided to the user may be any form of sensory feedback (e.g., visual feedback, auditory feedback, or tactile feedback); and input from the user may be received in any form, including acoustic input, voice input, or tactile input.

The systems and techniques described herein may be implemented in a computing system that includes a background component (e.g., as a data server), or a computing system that includes a middleware component (e.g., an application server), or a computing system that includes a front-end component (e.g., a user computer having a graphical user interface or a web browser through which a user may interact with embodiments of the system and technique described herein), or in a computing system that includes any combination of such background component, middleware component, or front-end component. The components of the system may be interconnected by any form or medium of digital data communication (e.g., a communication network). Examples of communication networks include Local Area Network (LAN), Wide Area Network (WAN), the Internet and BlockChain Network.

The computer system may include a client and a server. The client and the server are typically distant from each other and typically interact through a communication network. The relationship between the client and the server is generated by computer programs running on respective computers and having a client-server relationship with each other.

According to the technical solution of the embodiment of the present application, the applications and the system are monitored for the high-computational-power scenario, so that the system resources are scheduled when the system is monitored to be unable to bear the load, thereby providing sufficient system resources for the application which has entered the high-computational-power scenario, as such, not only the smooth running without any undesirable phenomenon such as lag of the application which has entered the high-computational-power scenario is ensured, but also the need of upgrading hardware configurations of the system are dispensed with, and the hardware costs of the system are reduced.

In addition, one embodiment of the above application has the following advantages or benefits: at first, the high-computational-power scenario of the running application is monitored, and whether the system can bear the load of the target application in the high-computational-power scenario is not predicted until the target application which has triggered and entered the high-computational-power scenario is monitored to exist in the system, so that not only the target application in need of ensured smooth running currently in the system is identified, but also a further basis is provided for the evaluation of the load pressure of the system. As such, the real capacity of the system to bear the load of the target application in the high-computational-power scenario is obtained, the subsequent system resource scheduling is ensured to be performed when the pressure is high (i.e., when the target application may lag in running), preventing useless scheduling of the system resources.

In addition, one embodiment of the above application has the following advantages or benefits: a basis is provided for predicting the high-computational-power scenario through the preset condition to trigger the high-computational-power scenario, the accuracy of the prediction is improved to determine the current running priorities of running applications in the system, and then the target application about to enter the high-computational-power scenario and in need of ensured smooth running is identified accurately.

In addition, one embodiment of the above application has the following advantages or benefits: on the basis of the current running state data of each running application and the CPU idle rate in the system, the capacity of the system to bear the load of the target application in the high-computational-power scenario is measured by calculating the load pressure score of the system, avoiding ignorance of target applications truly in need of ensured smooth running when the load pressure of the system is evaluated solely according to the system index such as the CPU occupancy rate, so that the accuracy of the load pressure measurement of the system is improved, the subsequent system resource scheduling is ensured to be performed when the pressure is high (i.e., when the target application may lag in running), preventing useless scheduling of the system resources.

In addition, one embodiment of the above application has the following advantages or benefits: hardware configurations of the system are not upgraded, instead, the system resource scheduling of the system is performed on the software level, hence the original costs of the hardware configuration of the system are kept, avoiding increased product costs and the influence on the sales caused by upgraded hardware configurations of the system. Besides, the limited resources in the system can be flexibly scheduled, fully exploiting the potentials to assist the target application in running in the high-computational-power scenario, and improving the utilization rate of the system resources.

In addition, one embodiment of the above application has the following advantages or benefits: by adjusting the handling time of each process under the CPU time-sharing processing mechanism, the priority of the process processing in each running application is properly adjusted to appropriate more CPU computing capacity to the target application from the other running applications, and prolong the handling time of the target application in one CPU processing cycle.

In addition, one embodiment of the above application has the following advantages or benefits: in the conventional CPU frequency regulation, the CPU frequency is continuously changing, featuring an overall long duration of frequency regulation, however, the target application enters the high-computational-power scenario too instantly for the traditional CPU frequency regulation method to catch up with, that is, the CPU frequency is still in a slow regulation process at the moment the target application enters the high-computational-power scenario and thus fails to support the target application in the high-computational-power scenario. Compared with the existing technology, the duration of frequency regulation of the CPU is greatly shortened in the embodiment to provide the target application with the highest running speed as soon as possible, thereby best ensuring the smooth running of the target application.

In addition, one embodiment of the above application has the following advantages or benefits: the processes in the running applications can be identified to determine the silence processes in the running applications, and all the silence processes are suspended, that is, the processes having no influence on the user experience are suspended, avoiding occupancy of system resources by the processes having no or little influence on the user experience, thereby appropriating more system resources to the target application without influencing the user experience.

It is appreciated that steps may be reordered, added, or removed in any form of procedure shown above. For example, the steps recited in the present application may be performed in parallel or sequentially or may be performed in a different order, so long as the desired results of the technical solution disclosed herein can be achieved, and no limitation is made herein.

The above-described embodiments are not to be construed as limiting the scope of the present application. It will be apparent to those skilled in the art that various modifications, combinations, sub-combinations, and substitutions are possible, depending on design requirements and other factors.

Any modifications, equivalents, and improvements without departing the spirit and principles of the present application are intended to be included within the scope thereof.

What is claimed is:

1. A resource scheduling method, comprising:
monitoring whether a current system is able to bear a load of a target application which has triggered and entered a high-computational-power scenario, wherein in a case where the target application is about to enter the high-computational-power scenario, a coming entry into the high-computational-power scenario is broadcasted;
subjecting the system to resource scheduling in a case that the system is monitored to be unable to bear the load of the target application, wherein after the system and other running applications which have not triggered or entered the high-computational-power scenario receive the broadcast, a high-computational-power process in the target application is set to be a real-time process, and a central processing unit (CPU) in the system and/or the other running applications are subjected to resource scheduling; and
running the target application in the high-computational-power scenario based on scheduled system resources.

2. The method according to claim 1, wherein the monitoring whether the current system is able to bear the load of the target application which has triggered and entered the high-computational-power scenario comprises:
monitoring whether the target application which has triggered and entered the high-computational-power scenario exists in the system according to running state data of applications running in the current system; and
monitoring whether the system is able to bear the load of the target application in a case that the target application exists in the system.

3. The method according to claim 2, wherein the monitoring whether the target application which has triggered and entered the high-computational-power scenario exists in the system according to the running state data of the applications running in the current system comprises:
determining a running application as the target application in a case that the running state data of the running application is detected to meet a condition to trigger the high-computational-power scenario.

4. The method according to claim 2, wherein the monitoring whether the system is able to bear the load of the target application comprises:
calculating a system load pressure score according to the current running state data of each running application in the system and a current idle rate of the CPU; and
determining that the system is unable to bear the load of the target application in a case that the system load pressure score is detected to be greater than a load pressure threshold value.

5. The method according to claim 1, wherein the subjecting the CPU in the system to resource scheduling comprises:
based on a time-sharing processing mechanism of the CPU, prolonging a process handling time of the target application in the system, and shortening the process handling time of the other running applications.

6. The method according to claim 1, wherein the subjecting the CPU in the system to resource scheduling comprises:
regulating a CPU frequency in the system to a maximum frequency.

7. The method according to claim 1, wherein the subjecting the other running applications which have not triggered or entered the high-computational-power scenario to resource scheduling comprises:
suspending silence processes of the other running applications in the system.

8. The method according to claim 1, wherein the system is an intelligent vehicle-mounted system, and the target application at least comprises a map navigation application and an intelligent voice application.

9. A resource scheduling apparatus, comprising:
at least one processor; and
a memory communicatively connected with the at least one processor, wherein
the memory stores instructions executable by the at least one processor, and the instruction, when executed by the at least one processor, enable the at least one processor to perform operations comprising:
monitoring whether a current system is able to bear a load of a target application which has triggered and entered a high-computational-power scenario, wherein in a case where the target application is about to enter the high-computational-power scenario, a coming entry into the high-computational-power scenario is broadcasted;
subjecting the system to resource scheduling in a case that the system is monitored to be unable to bear the load of the target application, wherein after the system and other running applications which have not triggered or entered the high-computational-power scenario receive the broadcast, a high-computational-power process in the target application is set to be a real-time process, and a central processing unit (CPU) in the system and/or the other running applications are subjected to resource scheduling; and
running the target application in the high-computational-power scenario based on scheduled system resources.

10. The apparatus according to claim 9, wherein the monitoring whether the current system is able to bear the load of the target application which has triggered and entered the high-computational-power scenario comprises:
monitoring whether the target application which has triggered and entered the high-computational-power scenario exists in the system according to running state data of applications running in the current system; and
monitoring whether the system is able to bear the load of the target application in a case that the target application exists in the system.

11. The apparatus according to claim 10, wherein the monitoring whether the target application which has triggered and entered the high-computational-power scenario exists in the system according to the running state data of the applications running in the current system comprises:
determining a running application as the target application in a case that the running state data of the running application is detected to meet a condition to trigger the high-computational-power scenario.

12. The apparatus according to claim 10, wherein the monitoring whether the system is able to bear the load of the target application comprises:
calculating a system load pressure score according to the current running state data of each running application in the system and a current idle rate of the CPU; and
determining that the system is unable to bear the load of the target application in a case that the system load pressure score is detected to be greater than a load pressure threshold value.

13. The apparatus according to claim 9, wherein the subjecting the CPU in the system to resource scheduling comprises:

based on a time-sharing processing mechanism of the CPU, prolonging a process handling time of the target application in the system, and shortening the process handling time of the other running applications.

14. The apparatus according to claim 9, wherein the subjecting the CPU in the system to resource scheduling comprises:

regulating a CPU frequency in the system to a maximum frequency.

15. The apparatus according to claim 9, wherein the subjecting the other running applications which have not triggered or entered the high-computational-power scenario to resource scheduling comprises:

suspending silence processes of the other running applications in the system.

16. The apparatus according to claim 9, wherein the system is an intelligent vehicle-mounted system, and the target application at least comprises a map navigation application and an intelligent voice application.

17. A non-transitory computer-readable storage medium storing computer instructions, wherein the computer instructions cause a computer to perform operations comprising:

monitoring whether a current system is able to bear a load of a target application which has triggered and entered a high-computational-power scenario, wherein in a case where the target application is about to enter the high-computational-power scenario, a coming entry into the high-computational-power scenario is broadcasted;

subjecting the system to resource scheduling in a case that the system is monitored to be unable to bear the load of the target application, wherein after the system and other running applications which have not triggered or entered the high-computational-power scenario receive the broadcast, a high-computational-power process in the target application is set to be a real-time process, and a central processing unit (CPU) in the system and/or the other running applications are subjected to resource scheduling; and running the target application in the high-computational-power scenario based on scheduled system resources.

18. The storage medium according to claim 17, wherein the monitoring whether the current system is able to bear the load of the target application which has triggered and entered the high-computational-power scenario comprises:

monitoring whether the target application which has triggered and entered the high-computational-power scenario exists in the system according to running state data of applications running in the current system; and monitoring whether the system is able to bear the load of the target application in a case that the target application exists in the system.

* * * * *